(12) United States Patent
Moshkovich et al.

(10) Patent No.: US 8,769,515 B2
(45) Date of Patent: Jul. 1, 2014

(54) SEMANTIC INTENSITY BASED DECOMPOSITION OF SOFTWARE SYSTEMS

(75) Inventors: Dany Moshkovich, Yokneam Ilit (IL); Amir Rubinstein, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/408,734

(22) Filed: Mar. 23, 2009

(65) Prior Publication Data
US 2010/0242019 A1    Sep. 23, 2010

(51) Int. Cl.
G06F 9/45    (2006.01)
G06F 9/44    (2006.01)

(52) U.S. Cl.
USPC ............ 717/154; 717/120; 717/151; 717/159

(58) Field of Classification Search
USPC ........................................................ 717/120
See application file for complete search history.

(56) References Cited

U.S. PATENT DOCUMENTS

| | | | | |
|---|---|---|---|---|
| 5,655,122 | A * | 8/1997 | Wu | 717/152 |
| 5,937,191 | A * | 8/1999 | Graham | 717/130 |
| 5,953,531 | A * | 9/1999 | Megiddo et al. | 717/160 |
| 6,029,004 | A * | 2/2000 | Bortnikov et al. | 717/158 |
| 6,185,592 | B1 * | 2/2001 | Boguraev et al. | 715/256 |
| 6,285,999 | B1 | 9/2001 | Page | |
| 6,314,562 | B1 * | 11/2001 | Biggerstaff | 717/156 |
| 6,357,040 | B1 * | 3/2002 | Porter | 717/154 |
| 7,124,276 | B2 * | 10/2006 | Pullen et al. | 711/210 |
| 7,330,849 | B2 | 2/2008 | Gerasoulis et al. | |
| 7,610,580 | B2 * | 10/2009 | Lagergren | 717/153 |
| 2007/0162903 | A1 * | 7/2007 | Babb et al. | 717/154 |
| 2009/0125549 | A1 * | 5/2009 | Li et al. | 707/103 R |

OTHER PUBLICATIONS

Yoshio Kataoka, Takeo Imai, Hiroki Andou, and Tetsuji Fukaya. "A Quantitative Evaluation of Maintainability Enhancement by Refactoring". IEEE. International Conference on Software Maintenance. 2002. pp. 576-585.*

Bart Du Bois, Serge Demeyer, and Jan Verelst. "Refactoring—Improving Coupling and Cohesion of Existing Code". IEEE. 11th Working Conference on Reverse Engineering. Nov. 2004. pp. 144-151.*

Frank Simon, Frank Steinbruckner, and Claus Lewerentz. "Metrics Based Refactoring". IEEE. Software Maintenance and Reengineering. Mar. 2001. pp. 30-38.*

Yul Yang Hong et al., "Indirect Coupling as a Criteria for Modularity", IEEE, First International Workshop on Assessment of Contemporary Modularization Techniques, 2007.

(Continued)

*Primary Examiner* — Lewis A Bullock, Jr.
*Assistant Examiner* — Keith C Yuen
(74) *Attorney, Agent, or Firm* — Daniel Kligler (57) ABSTRACT

A computer-implemented technique for analysis of software, is carried out using a semantic intensity calculation module, a coupling calculation module, and a software decomposition module. Software elements are identified in a computer program code, and respective roles of the software elements established. With the semantic intensity calculation module respective semantic intensity metrics are calculated for the software elements according to the roles thereof. With the coupling calculation module semantic intensity metrics are calculated to determine coupling factors between different software elements. With the software decomposition module the software elements are organized into distinct software components according to the coupling factors therebetween. Then, an optimized computer program code is generated from the software components.

17 Claims, 4 Drawing Sheets

(56) References Cited

OTHER PUBLICATIONS

Hayden Melton et al., "The CRSS Metric for Package Design Quality", Thirtieth Australasian Computer Science Conference (ACSC), 2007.

Markus Bauer et al., "Architecture-Aware Adaptive Clustering of OO Systems", IEEE, Eighth European Conference on Software Maintenance and Reengineering (CSMR), 2004.

Hong Yul Yang et al., "Measuring the Strength of Indirect Coupling", Australian Software Engineering Conference, 2007.

Eunjoo Lee et al., "Toward Component-Based System: Using Static Metrics and Relationships in Object-Oriented System", in Lecture Notes in Computer Science, Springer-Berlin, 2004.

* cited by examiner

SEMANTIC INTENSITY BASED DECOMPOSITION OF SOFTWARE SYSTEMS

BACKGROUND OF THE INVENTION

1. Field of the Invention

This invention relates to techniques for analyzing computer programs. More particularly, this invention relates to software componentization by calculation of semantic intensity.

2. Description of the Related Art

The meanings of certain acronyms and abbreviations used herein are given in Table 1.

TABLE 1

Acronyms and Abbreviations

| | |
|---|---|
| CD | Compact Disk |
| DVD | Digital Versatile Disc |
| EPROM | Erasable Programmable Read-Only Memory |
| LAN | Local Area Network |
| PROM | Programmable Read-Only Memory |
| RAM | Random Access Memory |
| RF | Radiofrequency |
| ROM | Read-Only Memory |
| SSI | Software Semantic Intensity |
| WAN | Wide Area Network |

Software componentization is an important stage in a reverse engineering process that enables high level software architecture to be understood. Analyzing coupling between software elements is widely used for the componentization process.

BRIEF SUMMARY

An embodiment of the invention provides a computer-implemented method for analysis of software, which is carried out by providing a computer system, wherein distinct software modules are embodied on a computer-readable medium and include at least a semantic intensity calculation module, a coupling calculation module, and a software decomposition module. The method is further carried out by identifying software elements in the code of a computer program, and establishing respective roles that the software elements play in the program code. The semantic intensity calculation module calculates respective semantic intensity metrics for the software elements according to the roles thereof. The coupling calculation module correlates the semantic intensity metrics to determine coupling factors between the software elements. The software decomposition module organizes the software elements into an arrangement of distinct software components according to the coupling factors therebetween. The method is further carried out by preparing optimized computer program code responsively to the arrangement, and writing the optimized computer program code as computer-readable instructions onto a tangible medium.

Other embodiments of the invention provide computer software product and apparatus for carrying out the above-described method. Another embodiment of the invention provides a method of configuring a computer software product for use in carrying out the above-described method.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Embodiments of the invention further provide for the construction of such a computer program product by employing programming techniques known in the computer arts to express algorithms as a series of instructions that can be executed by a computer, and the use of known mechanical, magnetic, and optical techniques or combinations thereof for forming the computer instructions on a tangible medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc (CD), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any tangible or intangible medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

Overview.

The complexity of software systems is continuously growing across a wide range of application domains. Developers are often faced with maintaining and enhancing large, complex systems, and need to deal with large amounts of code that describes systems at different levels of details. Such systems have semantics, i.e., relationships or mappings established between a syntactic structure and some domain. Semantics refers to the mathematical study of the meaning of programming languages and models of computation. The semantics in software systems may be difficult to understand, hidden, or even emergent. Raising the level of abstraction of such software systems can significantly improve their usability.

Although all parts of the code of a software application may be essential for the overall completeness and correctness of the application, different parts of the code are not equally "semantically-intense", i.e., they have different levels of importance and significance in the eyes of the developer. For example, one module or class or procedure having a high semantic intensity may be central to the functionality of the system, while another is minor or less meaningful. The term "software semantic intensity" (SSI) characterizes a software element. Software semantic intensity of a software element can be described by a metric that indicates a level of meaningfulness of a software element according to the ways the element is used in code, based on a predefined set of weights assigned to all recognized semantic evidences. Weights, in this context, are numeric representations assigned to semantic evidence to be used in further calculations. The term "semantic evidence" refers to a set of clues expressed in a form of formal language phrases that specifies a role, i.e., a semantic role of a software element in a particular fragment of code. As used herein, the term "software element" and "language element", i.e., elements of a programming language, are synonymous.

The ability to determine the semantic intensity of software elements can be very useful for understanding, validation and evolution of software systems. Determination of semantic intensity of software elements has been difficult in the past. Semantic intensity of software elements may be strongly affected by the manner in which they are used in code. Patterns and roles that software elements take part in may indicate different degrees of semantic intensity.

Embodiments of the present invention provide a particular SSI metric that captures the semantic intensity of software elements within a given scope. Here scope means any subset of code in which the software elements have an influence. The scope of an element can be derived through semantic analysis of elements in code, as is described in detail hereinbelow. The analysis takes into account the semantic intensity of the code that specifies a software element, as well as various semantic patterns and other usages of the element in the code.

One use of the SSI metric is the identification of the central elements in some functionality. Another use is detection of complex code segments that need simplification. This is achieved by detecting code segments wherein at least a portion of their semantic intensity metrics exceed a predefined threshold, based on the SSI metric of elements that appear in these segments. A third, more sophisticated use involves software decomposition. Software decomposition is a process of separation of a software system into disjoint sets of software elements according to some principle, e.g., semantic coupling. Once a software system has been decomposed, it is possible to work with the components individually, for example to reduce project build time and verification time. To illustrate this, assume that is necessary to test a software component that includes a large numbers of classes, and also assume that only a few of the classes are being frequently changed. Without decomposition of the software, whenever one of the classes is changed the entire project may have to be retested and rebuilt. However, by decomposing the system into components, all of the frequently changed, semantically coupled classes (or elements) may be grouped in a relatively small set of the components. When code involving the frequently changed classes (or elements) is modified, reconstructing the project involves rebuilding and re-verifying only that set of components in which the semantically coupled classes (or elements) occur. This will clearly result in a reduction of the build and verification time.

As noted earlier, different elements in a body of software code generally differ significantly in their level of importance in the software system. All elements are essential for the correctness and completeness of the software. However, as noted above, one element may be central to the functionality while another may be of minor importance. Central elements are more likely to appear in a high level description of the system; they represent major actors in the functionality, or are used or referenced extensively—statically or dynamically. The SSI metric reflects these properties. Placing programming software elements and code pieces on an "SSI-scale" has potential value for software developers and architects. For example, software verification efforts may concentrate on code having a relatively high SSI.

Figure 1:
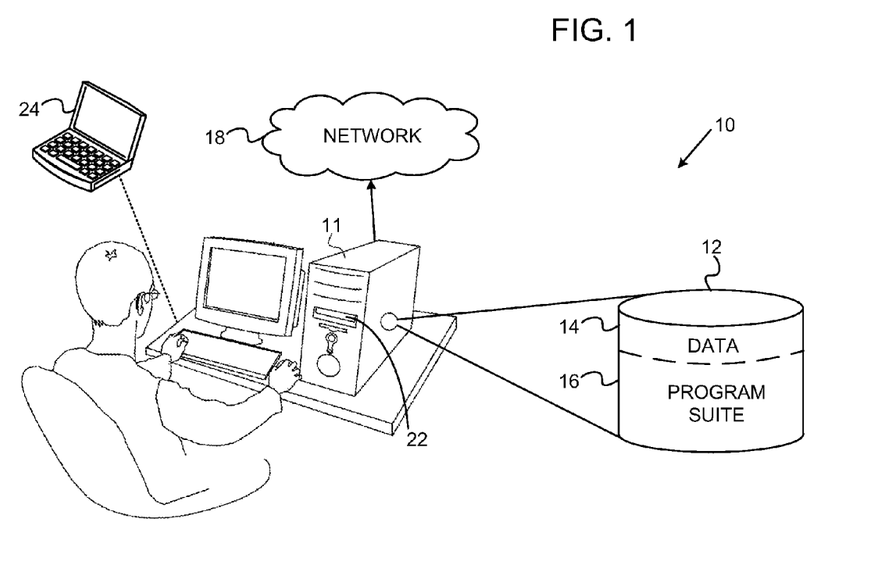
FIG. 1 is a schematic illustration of a system adapted for software componentization, which is constructed and operative in accordance with a disclosed embodiment of the invention.

Turning now to the drawings, reference is initially made to FIG. 1, which is a schematic illustration of a system 10 adapted for software componentization, which is constructed and operative in accordance with a disclosed embodiment of the invention.

The system 10 comprises a processor 11 and a memory 12 that stores data objects 14, including a model of the problem being solved. The processor 11 is programmed with a suitable suite of programs 16 for carrying out the functions described hereinbelow. Thus, although portions of the system 10 may be shown as comprising a number of separate functional blocks, these blocks are not necessarily separate physical entities, but rather represent different computing tasks or data objects stored in memory 12 that is accessible to the processor 11. These tasks may be carried out in software running on a single processor, or on multiple processors. The software may be provided to the processor or processors on tangible media, such as CD-ROM or non-volatile memory. Alternatively or additionally, the system 10 may comprise a digital signal processor or hardwired logic.

Although the memory 12 is shown in FIG. 1 as a local data store of the processor 11, the memory 12 may also be maintained at a site remote from the processor 11, for example, on a server or shared disk system (not shown), and accessed by the processor 11 via a network 18. In many environments the processor 11 is linked to other processors and databases via the network 18. However, this is not essential, and the system 10 may be realized as a stand-alone device. The system 10 includes one or more devices 22 for producing a software product on a computer-readable medium, for example a CD or DVD writer. Devices employing many other technologies are also suitable for use as the devices 22, for example, writers adapted to tapes, hard disc drives, RAM, ROM, flash memory devices, floppy drives, programmable read-only memory (PROM), erasable programmable read-only memory (EPROM), and magneto-optical discs. In all of these technologies patterns or transitions in the physical state of the medium are formed therein. These patterns and sequences of transitions encode instructions or data, e.g., binary numbers that are acceptable to the processor. The nature of the state transitions varies with the particular medium, and includes changes in magnetic domains in magnetic media, formation of pits or bumps on an optical disk, etc. Once the transitions are established, the medium may be transferred to another computing device 24, which is capable of reading the medium, recognizing the transitions, and decoding them to identify executable instructions or data.

Figure 2:
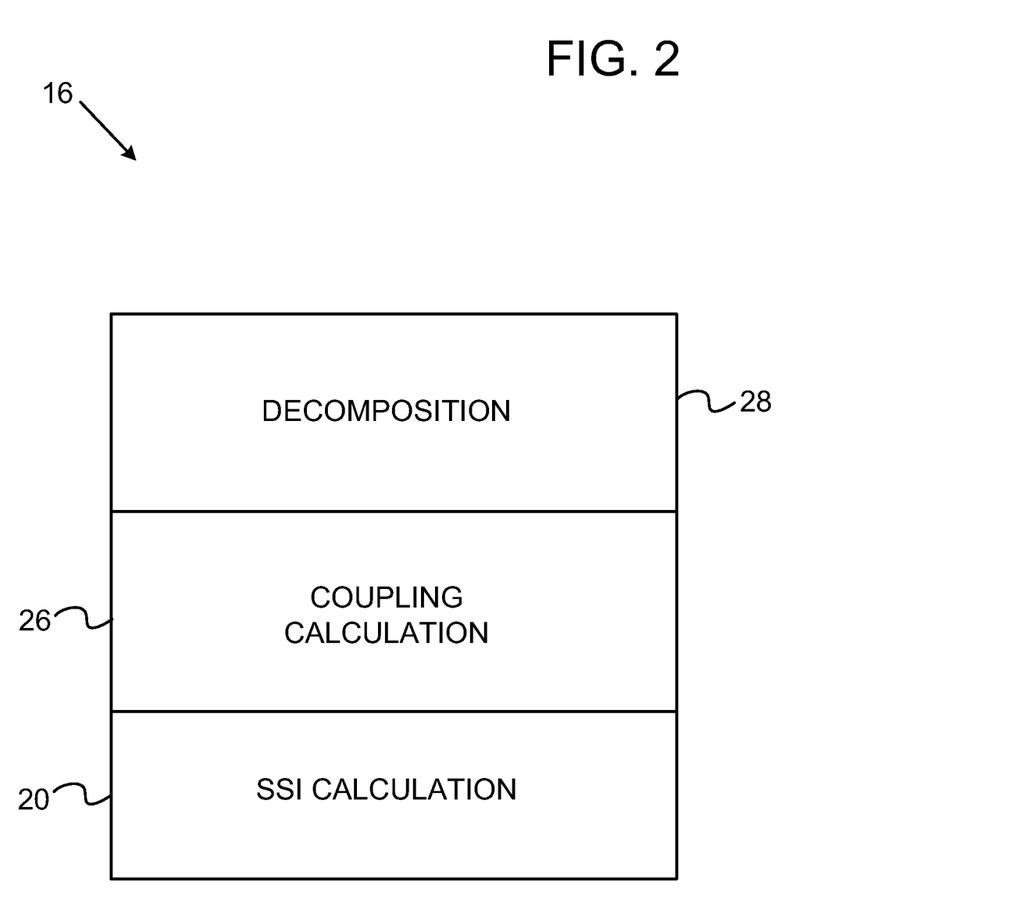
FIG. 2 is a detailed block diagram of the programs suite shown in FIG. 1, in accordance with a disclosed embodiment of the invention.

Reference is now made to FIG. 2, which is a detailed block diagram of the programs 16 (FIG. 1), in accordance with a disclosed embodiment of the invention. The memory 12 (FIG. 1) stores a specialized module, referred to herein as a software semantic intensity calculation module 20, (SSI Calculation module), which the processor 11 is programmed to access and execute. In addition, the programs 16 include a coupling calculation module 26 and a software decomposition module 28. The functions of these modules are explained in further detail below.

In the context of this disclosure, the term "software element" refers to any named element. For example, in Java, named elements include variables, class definitions, packages, and attributes, procedure and function definitions. The software semantic intensity of a software element is influenced by both the code that specifies an element (in the case of class or procedure definitions) and code regions in which the element is used. The following formula calculates the SSI of a given software element e in a given scope s (denoted SSI(e/s)):

$$SSI(e/s)=def(e)*ev(e/s) \quad (1),$$

where def(e) denotes the SSI of the code that specifies element e, and ev(e|s) represents the SSI of all semantic evidence, i.e., uses, of element e throughout the scope s. The SSI metric is additive:

$$SSI(e/s1)=SSI(e/s2)+SSI(e/s3) \quad (2),$$

if s1 consists of exactly s2 and s3.

The calculation of ev(e/s) is now explained. Named elements may appear in the code in various forms, which can be referred to as semantic patterns. Moreover, named elements may play different roles inside those patterns. For example, consider the simple code line of Listing 1:

a=b, Listing 1 where 'a' and 'b' are variables defined somewhere in the code. This line of code may be considered a semantic pattern, more particularly an assignment pattern. 'Destination' and 'source' are roles of the assignment pattern. Here variable a plays the role of the destination and variable b plays the role of the source. Clearly, roles of elements inside patterns affect their software semantic intensity in their scope. Therefore, a weight is assigned to each role. For example, if writing data into a variable implies a higher software semantic intensity than reading data, then the destination role should be assigned a larger weight than the source role in an assignment pattern.

A software element has a range of influence corresponding to its scope. The software semantic intensity of a software element in a region of code is calculated from the weights of the different roles of that element in the scope of the region. In Listing 1, the variables a and b have only one role each, but more complex examples can occur.

Even simpler patterns than the above-noted assignment pattern may be defined. For example, the creation of a variable may be considered as a very simple pattern. In general, every manner in which a software element appears in code can be defined as a pattern. Table 2 illustrates several of the simplest patterns.

TABLE 2

| Simple pattern that variable 'a' participates in | Example |
|---|---|
| Creation | A a; |
| Read | a == 5 |
| Write | a = 5; |

TABLE 2-continued

| Simple pattern that variable 'a' participates in | Example |
| --- | --- |
| Method-invocation | a.f( ); |
| Attribute-access | a.b; |

Using only the simple patterns shown in Table 1 one can cover almost all lines of code in which a given element appears, and get a first approximation of the SSI metric of an element in a given scope. However, in many cases software elements play additional roles in more sophisticated patterns. Taking this fact into consideration can significantly improve the quality of the SSI metric. Moreover, not all the patterns and roles influence the software semantic intensity of an element in the same manner. For example, primitive patterns tend to have a local influence, i.e., their influence is mainly limited to elements that appear in proximity to them or even inside them. Other, more sophisticated patterns, such the patterns described in the book *Design Patterns: Elements of Reusable Object-Oriented Software*, by Erich Gamma, Richard Helm, Ralph Johnson and John Vlissides, may have a wider influence, over various scopes in which the element is used. In order to reflect this fact in the SSI metric we maintain information for each role about the scope that is influenced by a variable or other element assuming that role.

EXAMPLE 1

This example illustrates the calculation of SSI. Consider the Java code segment shown in Listing 2:

Listing 2

```
if (a != b) {
    tmp = a;
    a = b;
    b = tmp;
}
```

Assume that we have defined an "if pattern", which has two roles: if_condition and if_body. In addition we have the simple roles mentioned earlier: source and destination. Assume that each role is assigned a weight, and a scope. In this simple case, within the scope, influences of the elements in their respective roles are all totally local. The scope of the if_condition role is exactly the parenthesized condition in the "if" statement; the scope of the if_body role is the bracketed code; the scope of the source and destination roles is the read and write statements, respectively. Variable a appears three times in the scope of the if pattern: first, as a source in the condition of the if statement and then twice more in the body of the if statement: once as source and once as destination. The SSI of variable a in the scope of the if pattern is calculated as follows: for every place that variable a appears in a defined scope, we multiply the weights of the roles whose scopes include this point in the code. The sum of all these products is the SSI of variable a in that scope. The term W(r) denotes the weight of role r:

$$SSI(a/s) = W(\text{source}) * W(\text{if\_condition}) + [W(\text{source}) + W(\text{destination})] * W(\text{if\_body}). \quad (3)$$

It may be useful to identify an additional pattern, "swap pattern", having a single role, swapped_element. The range of influence of the role swapped_element is local, limited to the lines of code that perform the swap. Having defined that, we should now multiply the second factor in the calculation by the weight W(swapped_element) to obtain:

$$SSI(a/s) = (W(\text{source}) * W(\text{if\_condition})) + [W(\text{source}) + W(\text{destination})] * W(\text{if\_body}) * W(\text{swapped\_element}). \quad (4)$$

Now, assume that we have defined an additional pattern in our system—a singleton pattern, which has one role: singleton. This role has a weight, denoted W(singleton), and let us assume that the range of influence of this role is the whole system. If the variable 'a' is defined in the system as a singleton element, we should multiply by W(singleton) each of the factors in the calculation we made before, as shown in Equation 5:

$$SSI(a/s) = W(\text{singleton}) * \{W(\text{source}) * W(\text{if\_condition}) + [W(\text{source}) + W(\text{destination})] * W(\text{if\_body})\}. \quad (5)$$

If, however, the range of the singleton role does not include any conditions inside "if" statements, then only the second factor should be multiplied by W(singleton), as shown in Equation 6:

$$SSI(a/s) = W(\text{source}) * [W(\text{singleton}) * W(\text{if\_condition})] + [W(\text{source}) + W(\text{destination})] * W(\text{if\_body})\}. \quad (6)$$

The explanation has so far related to the SSI calculation of elements such as variables. When dealing with SSI calculation of types, e.g., class definitions, as opposed to class instances, we should take into account not only semantic evidence in which the type name identifier appears directly, but also all the instances of that type. Thus, if we want to find the SSI of a class A in a given scope, we should look not only for places in which the class A appears directly (e.g., casting), but also for places where variables of type A appear.

Calculation of def(e).

The following section describes the calculation of the first term in the SSI metric, def(e) (Equation 1), which denotes the SSI of the code that specifies some element e. This is relevant for software elements that are specified by code fragments, such as procedures or classes definitions. For elements that do not contain code, such as variables, the term def(e) is a constant. It will be recalled from the preceding discussion that the specification of an element is considered in the calculation of its SSI, in addition to places in code in which it is used.

To quantify the term def(e), we weigh all the semantic evidence in the code that involves element e. This is done by summing the SSI's of all the evidence relating to the element e that appears in the specification code. Code that may involve recursion is referred to as a "recursive pattern. A constant weight is assigned to its roles. For example, if a function f( ) is recursive, as shown in Listing 3, then the SSI of the line of code that calls f( ) will be calculated as W(function_call)*W(recursive), and not W(function_call)*def(f( )).

Evaluation of the latter expression would lead to a recursive calculation.

Listing 3

```
void f( ) {
    f( )
}
```

In cases in which the implementation of a given element e in unknown, e.g., external libraries when the source is unavailable) or uncertain, dynamically bound elements, virtual functions calls, and calls through pointers to functions, the calculation of the term def(e) becomes problematic. We have considered three options to deal with this difficulty:
1) Take the average def(e) of an alternative implementation, if such exists;
2) Take the maximal value of def(e) if alternatives exist; and
3) Assign a pre-defined constant factor as the value of def(e). The constant factor may be customized by the user.

As the first two options do not preserve the additivity of SSI, the third option is believed to be the best.

The software semantic intensity metric can be applied to any piece of code, not just code that defines an element. This is useful for identifying complex code segments that need simplification. Such complex segments tend to have high semantic intensity. As an example, compare the two segments of Java code shown in Table 3:

TABLE 3

| ..... | ..... |
|---|---|
| if(a==2){ | if(a==b){ |
| a+=b; | a+=2; |
| } | } |

Apparently both code segments contain in total two source roles and one destination role. However, on the left side only one source role is located inside the 'if' condition, whereas on the right side both source roles are located inside the 'if' condition. This implies that that SSI(s2)>SSI(s1). The manner in which the elements are used in the code segment in the right column of Table 3 depends more on their values than that on the left column. The expression on the right side is less predictive, and thus more complex. To capture this difference, we should simply define weights such that W(if_condition) >W(if_body). And indeed, when calculating the SSI of each code segment, we get this desired result: For the code segment in the left column of Table 3, we get:

$$SSI(s1)=W(\text{source})*W(\text{if\_condition})+[W(\text{source})+W(\text{destination})]*W(\text{if\_body}) \quad (7),$$

while for the code segment in the right column we get:

$$SSI(s2)=2*W(\text{source})*W(\text{if\_condition})+W(\text{destination})*W(\text{if\_body}) \quad (8).$$

In order to apply this approach on software systems it is required to specify a set of patterns and roles and appropriate weights and scopes, and algorithms for their retrieval. The algorithms for the simple patterns can be derived from analysis of corresponding nodes in abstract syntax trees developed using JDT (Java Development Tool), available from the Eclipse Foundation, Inc., 102 Centrepointe Drive, Ottawa, Ontario, Canada, K2G 6B1 and the C/C++ Development Toolkit (CDT) available from International Business Machines Corporation, Armonk, N.Y. 10504. The only additional input that should be provided to the algorithm is a set of corresponding weights and ranges of influences.

Software Componentization.

Among its various uses, the SSI metric forms the basis for a method of software componentization. This approach is based on the calculation of coupling between elements using software semantic intensity. Assume there are two code elements A and B in a software system. The coupling between the two elements A and B is calculated based on the following factors: the SSI of element A in the scope of element B, the SSI of element B in the scope of element A, and the correlation between the SSI of element A and the SSI of element B in different scopes throughout the system. The software semantic intensity metric accurately and reliably reflects the coupling between software elements, allowing a more precise software componentization process. The coupling measurement is then applied to achieve componentization of software systems.

The SSI of an element A in the scope of an element B (denoted $SSI_{A/B}$) reflects the semantic dependency of element B on element A, as it captures all of the relevant semantic evidences of element A in the definitions of element B. In a similar manner, $SSI_{B/A}$ reflects the semantic dependency of element A on element B. As most of the componentization algorithm described below address coupling as an indirect and symmetric metric, we define a term SD to be the average between these two factors.

$$SD(A,B)=\text{avg}(SSI_{A|B},SSI_{B|A}) \quad (9),$$

where the notation SD indicates the joint SSI of the elements A,B. The use of the term SD is explained below, with respect to Equation 13.

It is useful to enrich the metric with information about the correlation between the semantic evidence of elements A and B in various scopes of the software system. There are various ways to measure the correlation between the SSI of elements A and B in a given scope, each with its advantages and disadvantages. A current embodiment employs one such way, which is believed to best reflect the indirect coupling between elements A and B. As procedures in a software system generally contain well defined functionalities, the correlation between SSI's of two elements should be calculated within the scopes of procedures. As different procedures may vary in complexity, the correlation function should be normalized to the SSI of the procedure itself. In addition for each element, the correlation is relative to the contribution to the SSI of the element within a procedure to the SSI of the same element in the entire software system. The correlation between the SSI of elements A and B in the scope of some procedure p can be calculated as follows:

$$Cor(A, B, p) = \frac{\min(SSI_{A|p}, SSI_{B|p})}{SSI_p} \cdot \left(\frac{SSI_{A|p}}{SSI_A} + \frac{SSI_{B|p}}{SSI_B}\right). \quad (10)$$

The correlation between elements A and B in the scope of the whole system (not a particular procedure) is calculated over all procedures in the system:

$$Cor(A, B) = \left(\sum_p (Cor(A, B, p))\right). \quad (11)$$

The sum in Equation 11 is taken over all the procedures in the system. Taking into consideration the expression for Cor (A, B, p) in Equation 10, we get:

$$Cor(A, B) = \sum_p \left(\frac{\min(SSI_{A|p}, SSI_{B|p})}{SSI_p} \cdot \left(\frac{SSI_{A|p}}{SSI_A} + \frac{SSI_{B|p}}{SSI_B}\right)\right). \quad (12)$$

Equation 12 will be more intuitive when the following examples are considered:

EXAMPLE 2

---
$SSI(A/p1) = 1$       $SSI(B/p1) = 1$
P1
$SSI(p1) = SSI(A/p1) + SSI(B/p1) = 2$

---

$SSI(A)=SSI(A/p1)=1;$ $SSI(B)=SSI(B/p1)=1;$

In this example elements A and B are highly correlated. Thus, the formula results in the large value: 1. P1 represents a procedure.

EXAMPLE 3

---
$SSI(A/p1) = 1$      $SSI(B/p1) = 1$      $SSI(c/p1) = 1$
P1
$SSI(p1) = SSI(A/p1) + SSI(B/p1) + SSI(c/p1) = 3$

---

$SSI(A)=SSI(A/p1)=1;$ $SSI(B)=SSI(B/p1)=1;$ $SSI(C)=SSI(C/p1)=1;$

In this example elements A and B are less correlated than in Example 2, as procedure p1 also contains other elements. Thus, the formula results in a lower value: 2/3. (min(1,1)/3* (1/1+1/1)=2/3)

EXAMPLE 4

---
$SSI(A/p1) = 1$  $SSI(B/p1) = 1$   $SSI(A/p2) = 1$  $SSI(C/p2) = 1$
P1                                  P2
$SSI(p1) = SSI(A/p1) +$             $SSI(p2) = SSI(A/p2) +$
$SSI(B/p1) = 2$                     $SSI(C/p2) = 2$

---

$SSI(A)=SSI(A/p1)+SSI(A/p2)=2;$ $SSI(B)=SSI(B/p1)=1;$

In this example in half of the cases element A is used without element B. Therefore the correlation between elements A and B is only 3/4. The correlation between elements A and C is also 3/4, and the correlation between elements B and C is 0.

The overall coupling factor between elements A and B, denoted as C(A,B), can be calculated using the following formula:

$$C(A, B) = (1 - \alpha) \cdot \frac{SD(A, B)}{MAX_{\forall(E1,E2)}(SD(E1, E2))} + \alpha \cdot Cor(A, B), \quad (13)$$

where α is the desired weight of the correlation factor that can be specified by the user, and E1 and E2 are any elements in the system.

Figure 3:
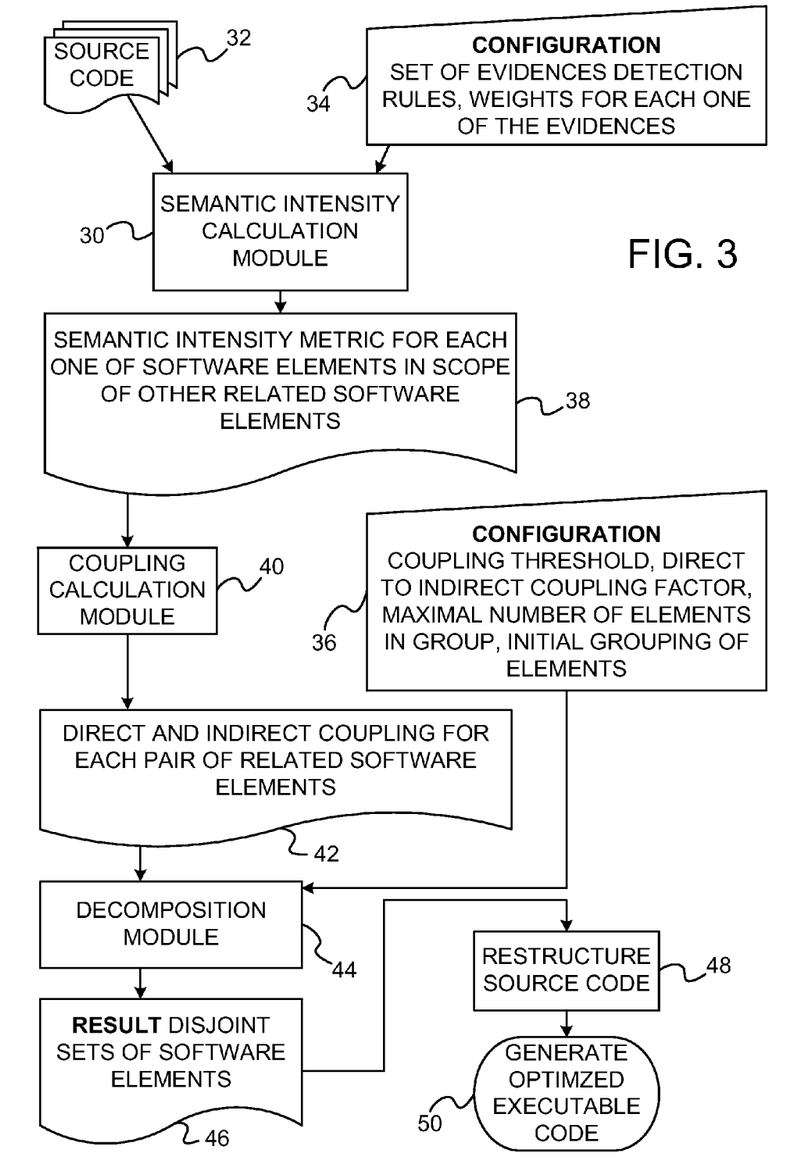
FIG. 3 is a flow chart of a method of software componentization, in accordance with a disclosed embodiment of the invention.

Now it is possible to apply known componentization algorithms. Reference is now made to FIG. 3, which is a flow chart of a method of software componentization, in accordance with a disclosed embodiment of the invention. The software semantic intensity calculation module 20 (FIG. 4) receives input at initial step 30, comprising source code 32, and configuration data 34, 36. The configuration data 34 includes a pre-weighted set of rules for evaluation of evidences of the use of software elements throughout the source code 32.

Next, at step 38, the semantic intensity metric described above is calculated for each of the software elements in the source code 32 within the scope of all other related software elements, respectively.

Figure 4:
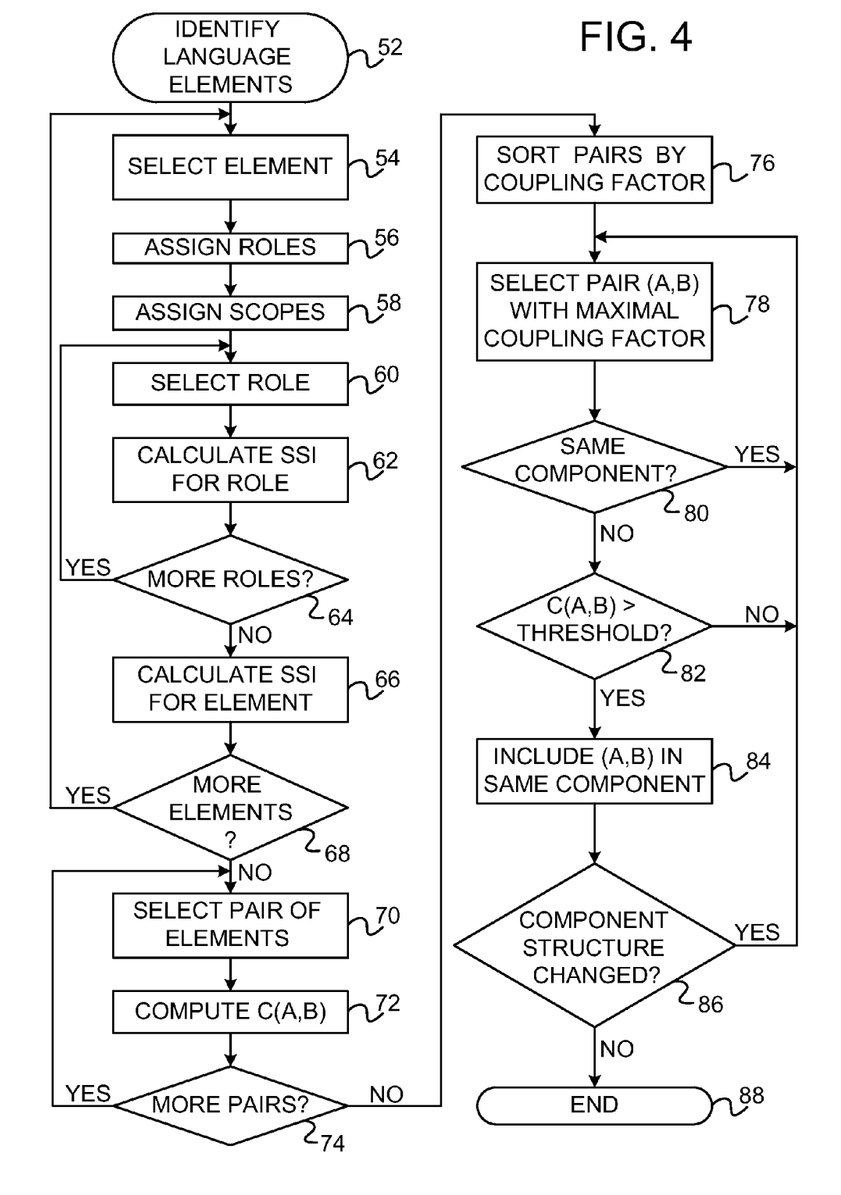
FIG. 4 is a flow chart of a method of software componentization, in accordance with a disclosed embodiment of the invention.

The results of the calculation in step 38 are presented in step 40 to the coupling calculation module 26 (FIG. 4). In step 42 direct and indirect coupling factors are computed for each pair of related software elements.

The software decomposition module 28 (FIG. 4) processes the output of the coupling calculation module 26 in step 44, using configuration data 36. The result, a disjoint set of software elements, is reported in step 46 as a suggested decomposition.

Next, at step 48, project make files can be changed to address the suggested decomposition obtained in step 46. In addition the user may rewrite a test suite to address newly suggested components. Additionally or alternatively, the code may be refactored, in order to ease future maintenance.

At final step 50, executable code is rebuilt from the rearranged, optimized source code obtained in step 48. The executable code is stored on a tangible computer-readable medium for distribution.

Reference is now made to FIG. 4, which is a more detailed flow chart of the method of software componentization shown in FIG. 3, in accordance with a disclosed embodiment of the invention. The process steps are shown in a particular linear sequence in for clarity of presentation. However, it will be evident that many of them can be performed in parallel, asynchronously, or in different orders.

At initial step 52 a program for analysis is selected and its software elements, including relevant code fragments are identified. For convenience of explication of FIG. 4, the software elements and code fragments are collectively referred to simply as elements.

Next, at step 54, one of the elements chosen in initial step 52 is selected.

Next, at step 56, roles for the current element are assigned by analysis of the program code. Then, as step 58 Scopes for the roles are determined, respectively, as described above. Identification of the roles in step 56 and scopes in step 58 can be done automatically.

Next, at step 60, one of the roles assigned in step 56 is selected. Then at step 62 the SSI of the current role is calculated using Equation 1 and Equation 2.

Control now proceeds to decision step 64, where it is determined if more roles remain to be evaluated. If the determination at decision step 64 is affirmative, then control returns to step 60.

If the determination at decision step 64 is negative, then control proceeds to step 66. The SSI for the current element is calculated, taking into consideration all its roles and usages in the program, using the teachings described above and expressed in Equations 4-8.

Control next proceeds to decision step 68, where it is determined if more software elements remain to be processed. If the determination at decision step 68 is affirmative, then control returns to step 54.

If the determination at step 68 is negative, then control proceeds to step 70, which begins a sequence in which elements are selected pairwise, the coupling factor C(A, B) is computed for each pair (A, B). A pair of elements is selected.

Next, at step 72 the coupling factor C(A, B) for the current pair of elements is calculated in accordance with Equation 13.

Control now proceeds to decision step 74, where it is determined if more pairs of elements remain to be processed. If the determination at decision step 74 is affirmative, then control returns to step 70.

If the determination at decision step 74 is negative, then control proceeds to step 76. The element pairs are sorted in descending order by coupling factor.

Next, at step 78, an eligible pair of elements (A, B) having a maximal coupling factor C(A, B) is selected. An eligible pair of elements is a pair that has not been determined to be in the same software component in previous iterations.

Control now proceeds to decision step 80, where it is determined if the current pair of elements is in the same software component. If the determination at decision step 80 is affirmative, then the current pair is marked as ineligible, and control returns to step 78.

If the determination at decision step 80 is negative, then control proceeds to decision step 82, where it is determined if the coupling factor C(A,B) for the pair identified in step 78 exceeds a pre-defined threshold. This threshold is application dependent. A default value is calculated to filter out 20 percent of the elements—those having the lowest coupling factors. The determination will always be negative on the first performance of decision step 80, as no components will as yet have been defined.

If the determination at decision step 82 is affirmative, then control proceeds to step 84. The current pair of elements (A, B) is included in a common software component. If one member of the pair already belongs to a component, then the other member of the pairs is assigned to that component. Otherwise a new component is defined and both members assigned to the new component At this point the pair of elements (A, B) may also be marked as ineligible for further selection in subsequent performances of step 78.

Decision step 86 is performed after completing step 84. Here a determination is made whether the step 84 resulted in a change in the component structure.

If the determination at decision step 86 is affirmative, then control returns to step 78 for a new iteration.

If the determination at decision step 86 is negative, then a final component structure has been achieved. Control proceeds to final step 88. The computer program can now be submitted to optimization tools known in the art or manually optimized in accordance with the component structure. For example, post-link optimization could be applied in accordance with the teachings of commonly assigned U.S. Patent Application Publication No. 2008/0141233, entitled "Presenting Machine Instructions in a Machine-Independent Tree Form Suitable for Post-Link Optimizations". The optimized program is then written to a tangible computer medium, for example using the devices 22 (FIG. 1) for execution or distribution.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method for analysis of software, comprising the steps of:

providing a computer system, wherein the system comprises distinct software modules embodied on a computer-readable medium, the distinct software modules comprising at least a semantic intensity calculation module, a coupling calculation module, and a software decomposition module;

identifying software elements in a computer program source code written in an object-oriented or procedural computer programming language, wherein the software elements comprise at least a portion of variables, classes, packages, procedures, functions, and attributes having respective scopes, the source code having scopes comprising subsets of code in which the software elements have an influence, and wherein at least a portion of the software elements have a plurality of uses in at least one of the scopes of the source code;

establishing respective roles of the software elements in the source code, the roles each having a predefined numeric weight, wherein the roles comprise an assignment pattern, a destination role and a source role within the assignment pattern, a variable creation role, a variable read operation role, a variable write operation role, a variable attribute access role, an if-pattern, an if-condition role of the if-pattern, and an if-body role of the if-pattern;

with the semantic intensity calculation module calculating respective semantic intensity metrics (SSI) for the software elements according to the weight of the roles thereof in the source code scopes thereof, wherein the semantic intensity metrics are additive according to a number of the uses of the software elements in respective scopes, and wherein the semantic intensity metric in one of the scopes is calculated as a product $$SSI(e/s) = def(e) * ev(e/s),$$

wherein def(e) denotes an SSI of the source code in the one scope that specifies an element e and ev(e/s) is an SSI of all roles of the element e within the one scope;

with the coupling calculation module correlating the semantic intensity metrics of the software elements to determine coupling factors between different ones of the software elements, wherein a coupling factor between a first software element A and a second software element B comprises a software semantic intensity of the first software element A in a scope of the second software element B ($SSI_{A/B}$), a software semantic intensity of the second software element B in a scope of the first software element A ($SSI_{B/A}$), and a correlation between the software semantic intensity of the first software element A and the software semantic intensity of the second software element B in a plurality of the scopes in the source code, wherein the correlation between $SSI_{A/B}$ and $SSI_{B/A}$ in a scope of a procedure p is calculated as a product $$Cor(A, B, p) = \frac{\min(SSI_{A|p}, SSI_{B|p})}{SSI_p} \cdot \left( \frac{SSI_{A|p}}{SSI_A} + \frac{SSI_{B|p}}{SSI_B} \right);$$

with the software decomposition module organizing the software elements into an arrangement of distinct software components according to the coupling factors therebetween;

preparing an optimized computer program source code responsively to the arrangement; and writing the optimized computer program source code as computer-readable instructions onto a tangible medium.

2. The method according to claim 1, wherein calculating respective semantic intensity metrics comprises assigning respective weights to the roles, and for each one of the software elements determining a sum of products of the roles of the one software element and the respective weights thereof.

3. The method according to claim 1, wherein organizing the software elements comprises assigning pairs of the software elements to a common software component when the coupling factor therebetween exceeds a predetermined threshold.

4. The method according to claim 1, wherein preparing the optimized computer program source code comprises:

detecting complex code segments wherein at least a portion of the semantic intensity metrics thereof exceed a predetermined threshold; and defining simplified code segments within the complex code segments.

5. The method according to claim 1, wherein the distinct software components form a project, the method further comprising the steps of:

identifying a set of distinct software components that include semantically coupled software elements;

modifying at least a portion of the semantically coupled software elements; and thereafter constructing the project by rebuilding only the set of distinct software components.

6. A method for configuring a computer-readable medium comprising:

forming transitions in a first tangible computer-readable medium, the transitions comprising digital patterns that are interpretable by a first computer as first instructions, which first instructions, when executed by the first computer, cause the first computer to perform a method of software analysis by:

identifying software elements in a computer program source code written in an object-oriented or procedural computer programming language, wherein the software elements comprise at least a portion of variables, classes, packages, procedures, functions, and attributes having respective scopes, the source code having scopes comprising subsets of code in which the software elements have an influence, and wherein at least a portion of the software elements have a plurality of uses in at least one of the scopes of the source code;

establishing respective roles of the software elements in the source code, the roles each having a predefined numeric weight, wherein the roles comprise an assignment pattern, a destination role and a source role within the assignment pattern, a variable creation role, a variable read operation role, a variable write operation role, a variable attribute access role, an if-pattern, an if-condition role of the if-pattern, and an if-body role of the if-pattern;

calculating respective semantic intensity metrics for the software elements according to the weight of the roles thereof in the source code, wherein the semantic intensity metrics (SSI) are additive according to a number of the uses of the software elements in respective scopes, and wherein the semantic intensity metric in one of the scopes is calculated as a product $$SSI(e/s) = def(e) * ev(e/s),$$

wherein def(e) denotes an SSI of the source code in the one scope that specifies an element e and ev(e/s) is an SSI of all roles of the element e within the one scope, and wherein a coupling factor between a first software element A and a second software element B comprises a software semantic intensity of the first software element A in a scope of the second software element B ($SSI_{A/B}$), a software semantic intensity of the second software element B in a scope of the first software element A ($SSI_{B/A}$), and a correlation between the software semantic intensity of the first software element A and the software semantic intensity of the second software element B in a plurality of the scopes in the source code;

correlating the semantic intensity metrics of the software elements to determine coupling factors between different ones of the software elements, wherein the correlation between $SSI_{A/B}$ and $SSI_{B/A}$ in a scope of a procedure p is calculated as a product $$Cor(A, B, p) = \frac{\min(SSI_{A|p}, SSI_{B|p})}{SSI_p} \cdot \left( \frac{SSI_{A|p}}{SSI_A} + \frac{SSI_{B|p}}{SSI_B} \right);$$

organizing the software elements into an arrangement of distinct software components according to the coupling factors therebetween;

responsively to the arrangement preparing an optimized computer program source code; and writing the optimized computer program source code onto a second tangible computer-readable medium.

7. The method according to claim 6, wherein calculating respective semantic intensity metrics comprises assigning respective weights to the roles, and for each one of the software elements determining a sum of products of the roles of the one software element and the respective weights thereof.

8. The method according to claim 6, wherein organizing the software elements comprises assigning pairs of the software elements to a common software component when the coupling factor therebetween exceeds a predetermined threshold.

9. The method according to claim 6, wherein preparing the optimized computer program source code comprises:

detecting complex code segments wherein at least a portion of the semantic intensity metrics thereof exceed a predetermined threshold; and simplifying the complex code segments.

10. A computer software product for analysis of software, including a non-transitory computer storage medium in which computer program instructions are stored, which instructions are organized as distinct software modules, the distinct software modules comprising at least a semantic intensity calculation module, a coupling calculation module, and a software decomposition module;

and when executed by a computer, cause the computer to perform the steps of:

identifying software elements in a computer program source code written in an object-oriented or procedural computer programming language, wherein the software elements comprise at least a portion of variables, classes, packages, procedures, functions, and attributes having respective scopes, the source code having scopes comprising subsets of code in which the software elements have an influence, and wherein at least a portion of the software elements have a plurality of uses in at least one of the scopes of the source code;

establishing respective roles of the software elements in the source code, the roles each having a predefined numeric weight, wherein the roles comprise an assignment pattern, a destination role and a source role within the assignment pattern, a variable creation role, a variable read operation role, a variable write operation role, a variable attribute access role, an if-pattern, an if-condition role of the if-pattern, and an if-body role of the if-pattern;

with the semantic intensity calculation module calculating respective semantic intensity metrics (SSI) for the software elements according to the weight of the roles thereof in the source code, wherein the semantic intensity metrics are additive according to a number of the uses of the software elements in respective scopes, and wherein the semantic intensity metric in one of the scopes is calculated as a product $$SSI(e/s)=def(e)*ev(e/s),$$

wherein def(e) denotes an SSI of the source code in the one scope that specifies an element e and ev(e/s) is an SSI of all roles of the element e within the one scope;

with the coupling calculation module correlating the semantic intensity metrics of the software elements to determine coupling factors between different ones of the software elements, wherein a coupling factor between a first software element A and a second software element B comprises a software semantic intensity of the first software element A in a scope of the second software element B ($SSI_{A/B}$), a software semantic intensity of the second software element B in a scope of the first software element A ($SSI_{B/A}$), and a correlation between the software semantic intensity of the first software element A and the software semantic intensity of the second software element B in a plurality of the scopes in the source code, wherein the correlation between $SSI_{A/B}$ and $SSI_{B/A}$ in a scope of a procedure p is calculated as a product $$Cor(A, B, p) = \frac{\min(SSI_{A|p}, SSI_{B|p})}{SSI_p} \cdot \left(\frac{SSI_{A|p}}{SSI_A} + \frac{SSI_{B|p}}{SSI_B}\right);$$

with the software decomposition module organizing the software elements into an arrangement of distinct software components according to the coupling factors therebetween;

preparing an optimized computer program source code responsively to the arrangement; and writing the optimized computer program source code onto a tangible medium.

11. The computer software product according to claim 10, wherein calculating respective semantic intensity metrics comprises assigning respective weights to the roles, and for each one of the software elements determining a sum of products of the roles of the one software element and the respective weights thereof.

12. The computer software product according to claim 10, wherein organizing the software elements comprises assigning pairs of the software elements to a common software component when the coupling factor therebetween exceeds a predetermined threshold.

13. The computer software product according to claim 10, wherein preparing the optimized computer program source code comprises:

detecting complex code segments wherein at least a portion of the semantic intensity metrics thereof exceed a predetermined threshold; and simplifying the complex code segments.

14. A data processing system for analysis of software, comprising:

a processor;

a memory accessible to the processor storing programs and data objects therein, the programs including at least a semantic intensity calculation module, a coupling calculation module, and a software decomposition module, wherein execution of the programs cause the processor to perform the steps of:

identifying software elements in a computer program source code written in an object-oriented or procedural computer programming language, wherein the software elements comprise at least a portion of variables, classes, packages, procedures, functions, and attributes having respective scopes, the source code having scopes comprising subsets of code in which the software elements have an influence, and wherein at least a portion of the software elements have a plurality of uses in at least one of the scopes of the source code;

establishing respective roles of the software elements in the source code, the roles each having a predefined numeric weight, wherein the roles comprise an assignment pattern, a destination role and a source role within the assignment pattern, a variable creation role, a variable read operation role, a variable write operation role, a variable attribute access role, an if-pattern, an if-condition role of the if-pattern, and an if-body role of the if-pattern;

with the semantic intensity calculation module calculating respective semantic intensity metrics (SSI) for the software elements according to the weight of the roles thereof in the source code, wherein the semantic intensity metrics are additive according to a number of the uses of the software elements in respective scopes, and wherein the semantic intensity metric in one of the scopes is calculated as a product $$SSI(e/s)=def(e)*ev(e/s),$$

wherein def(e) denotes an SSI of the source code in the one scope that specifies an element e and ev(e/s) is an SSI of all roles of the element e within the one scope;

with the coupling calculation module correlating the semantic intensity metrics of the software elements to determine coupling factors between different ones of the software elements, wherein a coupling factor between a first software element A and a second software element B comprises a software semantic intensity of the first software element A in a scope of the second software element B ($SSI_{A/B}$), a software semantic intensity of the second software element B in a scope of the first software element A ($SSI_{B/A}$), and a correlation between the software semantic intensity of the first software element A and the software semantic intensity of the second software element B in a plurality of the scopes in the source code, wherein the correlation between $SSI_{A/B}$ and $SSI_{B/A}$ in a scope of a procedure p is calculated as a product $$Cor(A, B, p) = \frac{\min(SSI_{A|p}, SSI_{B|p})}{SSI_p} \cdot \left(\frac{SSI_{A|p}}{SSI_A} + \frac{SSI_{B|p}}{SSI_B}\right);$$

with the software decomposition module organizing the software elements into an arrangement of distinct software components according to the coupling factors therebetween;

preparing an optimized computer program source code responsively to the arrangement; and writing the optimized computer program source code onto a tangible medium.

15. The data processing system according to claim 14, wherein calculating respective semantic intensity metrics comprises assigning respective weights to the roles, and for each one of the software elements determining a sum of products of the roles of the one software element and the respective weights thereof.

16. The data processing system according to claim 14, wherein organizing the software elements comprises assigning pairs of the software elements to a common software component when the coupling factor therebetween exceeds a predetermined threshold.

17. The data processing system according to claim 14, wherein preparing the optimized computer program source code comprises:

detecting complex code segments wherein at least a portion of the semantic intensity metrics thereof exceed a predetermined threshold; and simplifying the complex code segments.

* * * * *